United States Patent
Kim

(10) Patent No.: US 9,334,819 B2
(45) Date of Patent: May 10, 2016

(54) METHOD FOR DIAGNOSING EGR SYSTEM AND METHOD FOR CONTROLLING FUEL INJECTION USING THE SAME

(71) Applicants: Hyundai Motor Company, Seoul (KR); Kia Motors Corp., Seoul (KR)

(72) Inventor: Seung Bum Kim, Seongnam-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 276 days.

(21) Appl. No.: 14/044,536

(22) Filed: Oct. 2, 2013

(65) Prior Publication Data

US 2014/0372011 A1     Dec. 18, 2014

(30) Foreign Application Priority Data

Jun. 17, 2013 (KR) .................. 10-2013-0068965

(51) Int. Cl.
    *F02M 25/07*     (2006.01)
    *F02D 41/00*     (2006.01)

(52) U.S. Cl.
    CPC ........ *F02D 41/0072* (2013.01); *F02D 41/0055* (2013.01); *F02M 25/0702* (2013.01); *F02D 2200/0402* (2013.01); *F02M 25/0726* (2013.01)

(58) Field of Classification Search
    CPC ............ F02D 41/0055; F02D 41/0072; F02M 25/0726; F02M 25/0702
    USPC ................ 123/568.16, 568.21; 701/107, 108; 73/114.37, 114.74
    See application file for complete search history.

(56) References Cited

U.S. PATENT DOCUMENTS

| | | | |
|---|---|---|---|
| 7,587,892 B2* | 9/2009 | Dye et al. | 60/295 |
| 8,091,535 B2* | 1/2012 | Nitzke et al. | 123/568.12 |
| 8,769,931 B2* | 7/2014 | Nam | 60/278 |
| 9,062,635 B2* | 6/2015 | Chi et al. | |

FOREIGN PATENT DOCUMENTS

| | | |
|---|---|---|
| JP | 5-52152 A | 3/1993 |
| JP | 2724000 B2 | 11/1997 |
| JP | 2003-21000 A | 1/2003 |
| JP | 2012-87676 A | 5/2012 |
| KR | 1999-003078 A | 1/1999 |
| KR | 10-2006-0069627 A | 6/2006 |
| KR | 10-0887968 B1 | 3/2009 |
| KR | 10-1229461 B1 | 2/2013 |

* cited by examiner

*Primary Examiner* — Hai Huynh
(74) *Attorney, Agent, or Firm* — Morgan, Lewis & Bockius LLP

(57) ABSTRACT

A method for diagnosing an EGR system, includes: a first measuring step of measuring a pressure in an intake manifold; a second measuring step of measuring a pressure and a temperature between an EGR cooler and an EGR valve; a determining step of calculating and determining an opening area of the EGR valve for satisfying a target flow of EGR using a function of the target flow of EGR, the pressure in the intake manifold, and the temperature and the pressure between the EGR cooler and the EGR valve; and a diagnosing step of diagnosing whether the EGR cooler is abnormal by comparing the temperature measured between the EGR cooler and the EGR valve and a reference temperature with each other at the time of exhausting EGR gas at the determined opening area of the EGR valve.

10 Claims, 3 Drawing Sheets

METHOD FOR DIAGNOSING EGR SYSTEM AND METHOD FOR CONTROLLING FUEL INJECTION USING THE SAME

CROSS REFERENCE TO RELATED APPLICATION

The present application claims priority of Korean Patent Application Number 10-2013-0068965 filed Jun. 17, 2013, the entire contents of which application is incorporated herein for all purposes by this reference.

BACKGROUND OF INVENTION

1. Field of Invention

The present invention relates to an exhaust gas recirculation (EGR) system, and more particularly, to a method for diagnosing an EGR system capable of diagnosing a fault of the EGR system without a separate exhaust temperature sensor by monitoring efficiency of an EGR cooler using pressure and temperature values measured in an intake manifold and an EGR line and capable of controlling a fuel amount of an engine by calculating a flow of EGR and a flow of fresh gas, and a method for controlling fuel injection using the same.

2. Description of Related Art

FIG. 1 is a view schematically showing a configuration of an exhaust gas recirculation (EGR) system according to the related art.

Referring to FIG. 1, in the EGR system, a flow of EGR gas has been controlled based on a manifold absolute pressure (MAP) sensor disposed at a rear end of an electronic throttle actuator control (ETC).

However, in the case in which reliability of a signal value of the MAP sensor is low (disturbance, fault, leakage, or the like), calculation for a flow of fresh air introduced into a combustion chamber as well as the control of the flow of EGR is inaccurate, such that stability of combustion may not be satisfied and an ignition time and a valve overlap time may not be controlled.

Therefore, in order to prevent these problems, a mass air flow (MAF) sensor has been mounted at a front end of the ETC to measure an accurate value for an amount of fresh air, thereby making it possible to secure a basic combustion feature regardless of a fault of the MAP sensor. In addition, when the amount of fresh air is measured by the MAF sensor, it is converted into a pressure value and is then compared with a pressure value measured by the MAP sensor, thereby making it possible to accurately control a flow of EGR.

Meanwhile, an ultimate object of an EGR cooler 1 used in the EGR system is as follows. When a temperature of EGR gas is lowered by the EGR cooler 1, the cooled EGR gas is introduced into a combustion chamber to lower a temperature of the combustion chamber, such that a knocking generation region is suppressed to advance an ignition time, thereby improving a torque and fuel efficiency.

That is, a temperature control of the EGR gas in the EGR system is an important item in several views, and the EGR system recently has a configuration in which the temperature of the EGR gas is lowered by the EGR cooler.

Here, the EGR cooler is an on-board diagnostics (OBD) law item. In order to satisfy fault code monitoring for exhaust gas dissatisfaction of US California Air Resources Board (CARB) and Europe on-board diagnostics (EOBD) forced monitoring, a temperature sensor is mounted at a rear end of the EGR cooler, that is, a front end of an EGR valve to measure the temperature of the EGR gas passing through the EGR cooler, thereby monitoring efficiency of the EGR cooler.

However, in the EGR system according to the related art, as described above, the MAF sensor is installed in order to control the amount of fresh air and the exhaust temperature sensor 2 is separately installed in order to monitor the EGR cooler, so that an additional cost is required to mount the MAF sensor and the exhaust temperature sensor. Particularly, the exhaust temperature sensor, which is a relatively expensive component, causes a cost increase.

Meanwhile, according to the related art, Korean Patent Laid-Open Publication No. 10-2006-0069627 entitled "Method for Controlling EGR Cooler" has been disclosed.

However, even in the method disclosed in Korean Patent Laid-Open Publication No. 10-2006-0069627, since the temperature sensor is mounted in the EGR system, a problem that a component cost required to mount the temperature sensor is increased may not be solved.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method for diagnosing an exhaust gas recirculation (EGR) system capable of diagnosing a fault of the EGR system without a separate exhaust temperature sensor by monitoring efficiency of an EGR cooler using pressure and temperature values measured in an intake manifold and an EGR line and decreasing a cost of a vehicle by removing the exhaust temperature sensor in the EGR system, and a method for controlling fuel injection using the same.

Various aspects of the present invention provide for a method for diagnosing an EGR system capable of controlling a fuel amount of an engine by calculating a flow of EGR and a flow of fresh gas through pressure values measured in an intake manifold and an EGR line, and a method for controlling fuel injection using the same.

According to various aspects of the present invention, there is provided a method for diagnosing an EGR system, including: a first measuring step of measuring a pressure in an intake manifold; a second measuring step of measuring a pressure and a temperature between an EGR cooler and an EGR valve; a determining step of calculating and determining an opening area of the EGR valve for satisfying a target flow of EGR using a function of the target flow of EGR, the pressure in the intake manifold, and the temperature and the pressure between the EGR cooler and the EGR valve; and a diagnosing step of diagnosing whether or not the EGR cooler is abnormal by comparing the temperature measured between the EGR cooler and the EGR valve and a reference temperature with each other at the time of exhausting EGR gas at the determined opening area of the EGR valve.

The method may further include a judging step of judging whether an output element reflecting a driving state of a vehicle is equal to or larger than a reference value to judge whether or not a diagnosis is possible.

A first integration sensor may be installed in the intake manifold to measure both of a pressure and a temperature of an intake air, and a second integration sensor may be installed between the EGR cooler and the EGR valve to measure both of a pressure and a temperature of the EGR gas.

In the determining step, the target flow of EGR may be determined depending on a target opening area of the EGR valve to calculate and determine the opening area of the EGR valve so as to satisfy the target opening area, thereby satisfying the target flow of EGR.

The diagnosing step may include: a fault diagnosing step of diagnosing that a fault has been generated in the EGR cooler when the temperature measured between the EGR cooler and the EGR valve exceeds the reference temperature; and a normality diagnosing step of diagnosing that the EGR cooler is normal when the temperature measured between the EGR cooler and the EGR valve is equal to or lower than the reference temperature.

The normality diagnosing step may include: a third measuring step of measuring the opening area of the EGR valve; a first calculating step of calculating a mass flow value of the EGR gas passing through the EGR valve as a function of the pressure in the intake manifold, the temperature and the pressure between the EGR cooler and the EGR valve, and the opening area of the EGR valve; a first converting step of converting the calculated mass flow value of EGR gas into a pressure value; a second calculating step of calculating a pressure value of fresh air as a function of the pressure in the intake manifold and the pressure value converted in the first converting step; and a second converting step of converting the calculated pressure value of the fresh air into a mass flow value of the fresh air.

The opening area of the EGR valve may be measured by a position sensor of the EGR valve.

In the first converting step, the mass flow value of the EGR gas may be converted into the pressure value using a function of the mass flow value of the EGR gas, a unit area of a conduit through which the EGR gas moves while passing through the EGR valve, and the temperature between the EGR cooler and the EGR valve.

In the second converting step, the pressure value of the fresh air may be converted into the mass flow value of the fresh air using a function of a pressure of the fresh air, a unit area of a conduit through which the fresh air is introduced into the intake manifold, and the temperature in the intake manifold.

Various aspects of the present invention provide for a method for controlling a fuel injection amount using the method as described above, including: a third measuring step of measuring the opening area of the EGR valve; a first calculating step of calculating a mass flow value of the EGR gas passing through the EGR valve as a function of the pressure in the intake manifold, the temperature and the pressure between the EGR cooler and the EGR valve, and the opening area of the EGR valve; a first converting step of converting the calculated mass flow value of EGR gas into a pressure value; a second calculating step of calculating a pressure value of fresh air as a function of the pressure in the intake manifold and the pressure value converted in the first converting step; a second converting step of converting the calculated pressure value of the fresh air into a mass flow value of the fresh air; and a controlling step of controlling the fuel injection amount depending on the mass flow value of the fresh air.

In the first converting step, the mass flow value of the EGR gas may be converted into the pressure value using a function of the mass flow value of the EGR gas, a unit area of a conduit through which the EGR gas moves while passing through the EGR valve, and the temperature between the EGR cooler and the EGR valve.

In the second converting step, the pressure value of the fresh air may be converted into the mass flow value of the fresh air using a function of a pressure of the fresh air, a unit area of a conduit through which the fresh air is introduced into the intake manifold, and the temperature in the intake manifold.

The present methods and apparatuses have other features and advantages apparent from the accompanying drawings, incorporated herein, and below Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
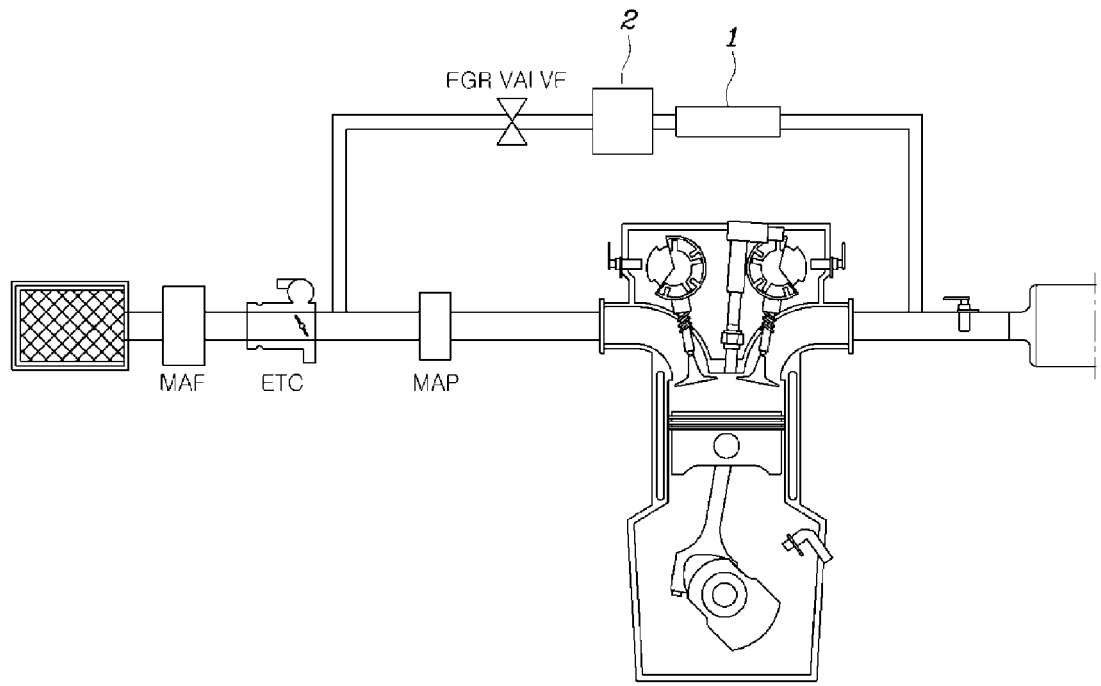
FIG. 1 is a view schematically showing a configuration of an exhaust gas recirculation (EGR) system according to the related art.
Figure 2:
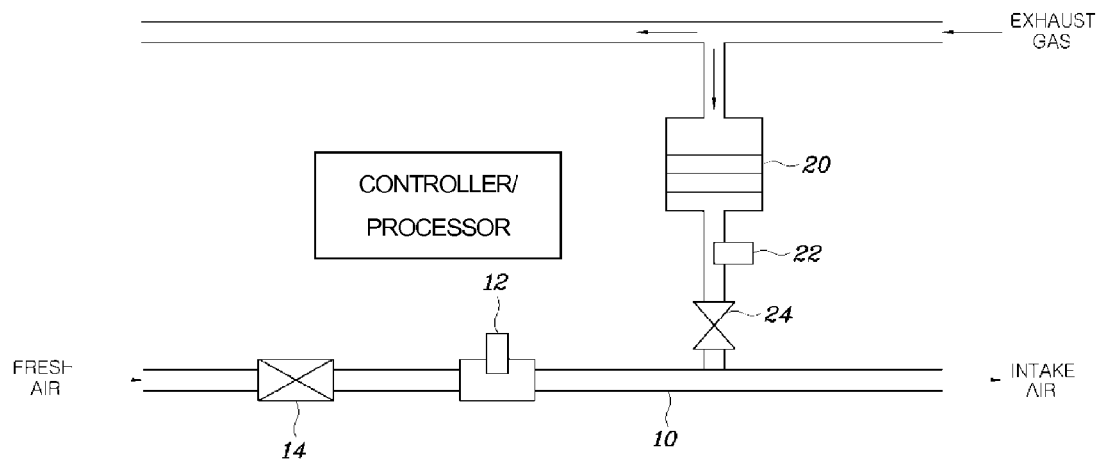
FIG. 2 is a view schematically showing a configuration of an exemplary EGR system according to the present invention.
Figure 3:
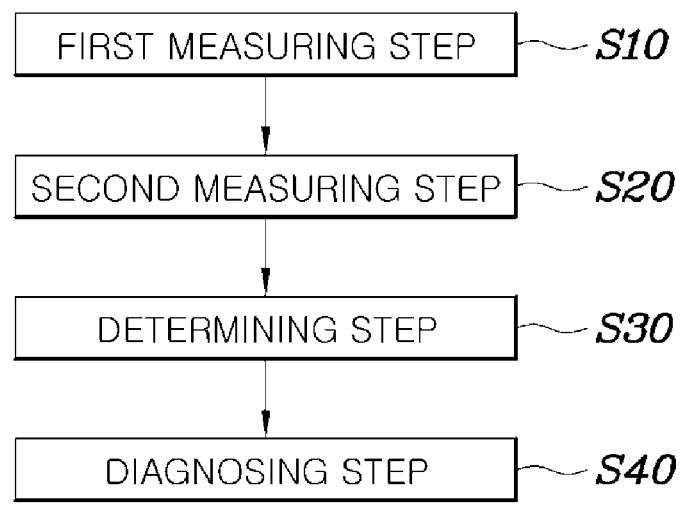
FIG. 3 is a view briefly showing an exemplary method for diagnosing an EGR system according to the present invention.
Figure 4:
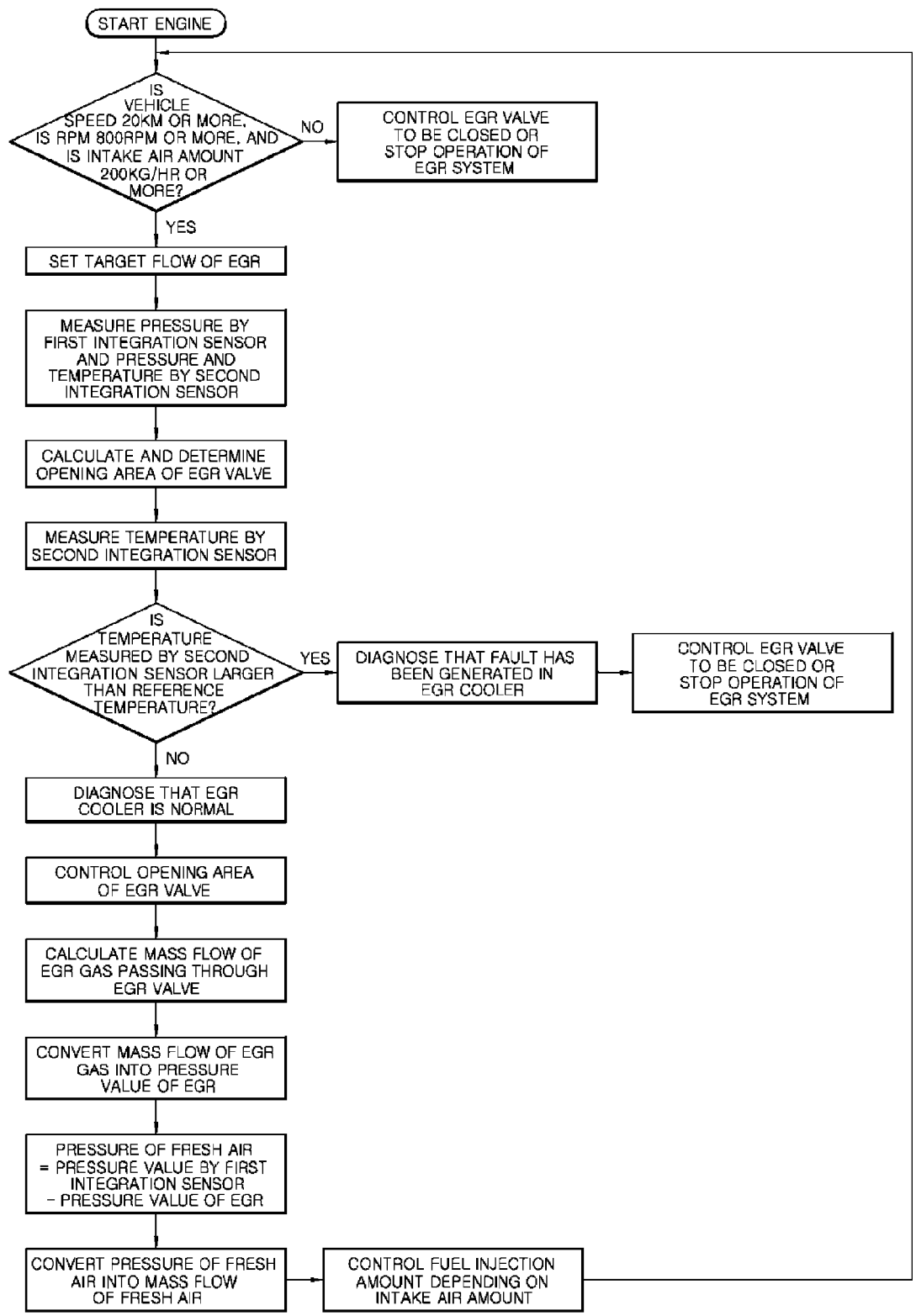
FIG. 4 is a flow chart for describing a diagnosing flow and a controlling flow of the method for diagnosing an EGR system of FIG. 3 according to the present invention and a method for controlling fuel injection using the same.

FIG. 2 is a view schematically showing a configuration of an exhaust gas recirculation (EGR) system according to various embodiments of the present invention; FIG. 3 is a view briefly showing a method for diagnosing an EGR system according to various embodiments of the present invention; and FIG. 4 is a flow chart for describing a diagnosing flow and a controlling flow of the method for diagnosing an EGR system according to various embodiments of the present invention and a method for controlling fuel injection using the same.

The method for diagnosing an EGR system according to various embodiments of the present invention includes a first measuring step (S10), a second measuring step (S20), a determining step (S30), and a diagnosing step (S40).

The method for diagnosing an EGR system according to various embodiments of the present invention will be described in detail with reference to FIGS. 2 to 4. The method for diagnosing an EGR system according to various embodiments of the present invention includes the first measuring step (S10) of measuring a pressure in an intake manifold 10; the second measuring step (S20) of measuring a pressure and a temperature between an EGR cooler 20 and an EGR valve 24; the determining step (S30) of calculating and determining an opening area of the EGR valve 24 for satisfying a target flow of EGR using a function of the target flow of EGR, the pressure in the intake manifold 10, and the temperature and the pressure between the EGR cooler 20 and the EGR valve 24; and the diagnosing step (S40) of diagnosing whether or not the EGR cooler 20 is abnormal by comparing the temperature measured between the EGR cooler 20 and the EGR valve 24 and a reference temperature with each other at the time of exhausting EGR gas at the determined opening area of the EGR valve 24.

That is, in the first measuring step (S10), a first integration sensor 12 may be installed at a rear end of a throttle valve 14 introducing fresh air into the intake manifold 10 and operably connected to a controller/processor to measure an intake air pressure in the intake manifold 10. Here, the first integration sensor 12, which may be a manifold absolute pressure (MAP) sensor capable of simultaneously measuring a temperature and a pressure, measures both of the pressure and the temperature in the intake manifold 10. Here, the throttle valve 14 may be an electronic throttle actuator control (ETC) operably connected to the controller/processor.

In addition, in the second measuring step (S20), a second integration sensor 22 may be installed between a front end of the EGR cooler 20 and a rear end of the EGR valve 24 and operably connected to a controller/processor to measure a pressure of the EGR gas between the EGR cooler 20 and the EGR valve 24. Here, the second integration sensor 22, which may be an MAP sensor capable of simultaneously measuring a temperature and a pressure, measures both of the pressure and the temperature between the EGR cooler 20 and the EGR valve 24.

The EGR gas passing through the EGR cooler 20 may be introduced into the intake manifold 10 through the EGR valve 24 by the above-mentioned structure.

In addition, the method for diagnosing an EGR system according to various embodiments of the present invention may further include, before the first measuring step (S10), a judging step of judging whether an output element reflecting a driving state of a vehicle is equal to or larger than a reference value to judge whether or not a diagnosis is possible.

Here, the output element reflecting the driving state of the vehicle may be a vehicle speed, an engine revolution per minute (RPM), an intake air amount, or the like. For example, in the case in which the vehicle speed is 20 km/h or more, the RPM is 800 rpm or more, and the intake air amount is 200 kg/h or more, a diagnosis of the EGR system may be continuously performed, and in the case in which the vehicle speed is less than 20 km/h, the RPM is less than 800 rpm, and the intake air amount is less than 200 kg/h, the EGR valve 24 is controlled to be closed or an operation of the EGR system is stopped, such that a diagnosis of the EGR system may not be performed.

In the determining step (S30), a function of a target flow of EGR mapped so as to reflect the driving state of the vehicle, the pressure measured by the first integration sensor 12, and the temperature and the pressure measured by the second integration sensor 22 is used to calculate the opening area of the EGR valve 24 for satisfying the target flow of EGR and determine an opening amount of the EGR valve 24 by the calculated opening area of the EGR valve 24.

The opening area of the EGR valve 24 determined in the determining step (S30) is generally represented by the following Equation 1.

$$m_p = A_1 \cdot f(T_2) \cdot f(P_1, P_2)$$ (Equation 1)

In Equation 1, $m_p$ indicates the target flow of EGR, $A_1$ indicates the opening area of the EGR valve 24 that needs to be calculated, $T_2$ indicates the temperature measured by the second integration sensor 22, and $P_1$ and $P_2$ indicate the pressures measured by the first and second integration sensors 12 and 22, respectively.

Here, see contents disclosed in Korean Patent Laid-Open Publication No. 10-2000-0064611 A1, U.S. Pat. No. 5,714, 683, and the like, with respect to a constant derived by inputting $T_2$ to $f(T_2)$ and a constant derived by inputting $P_1$ and $P_2$ to $f(P_1, P_2)$.

In the determining step (S30), the target flow of EGR is determined depending on a target opening area of the EGR valve 24. Therefore, the opening area of the EGR valve 24 is calculated and determined so as to satisfy the target opening area, thereby making it possible to satisfy the target flow of EGR.

In the diagnosing step (S40), at the time of exhausting the EGR gas through the EGR valve 24 at the opening area of the EGR valve 24 determined in the determining step (S30), the temperature measured between the EGR cooler 20 and the EGR valve 24, that is, the temperature measured through the second integration sensor 22 and the reference temperature are compared with each other, thereby making it possible to diagnose whether or not the EGR cooler 20 is abnormal.

More specifically, the diagnosing step (S40) may include a fault diagnosing step and a normality diagnosing step.

First, in the fault diagnosing step, when the temperature measured between the EGR cooler 20 and the EGR valve 24 exceeds the reference temperature, it is diagnosed that a fault has been generated in the EGR cooler 20. Then, the EGR valve 24 is controlled to be closed or an operation of the EGR system is stopped.

In addition, in the normality diagnosing step, when the temperature measured between the EGR cooler 20 and the EGR valve 24 is equal to or lower than the reference temperature, it is diagnosed that the EGR cooler 20 is normal, and the opening area of the EGR valve 24 may be controlled by a pulse width modulation (PWM) control.

As described above, according to various embodiments of the present invention, efficiency of the EGR cooler 20 is diagnosed using the first integration sensor 12 installed at the intake manifold 10 and the second integration sensor 22 installed between the EGR cooler 20 and the EGR valve 24, such that the efficiency of the EGR cooler 20 may be diagnosed without using an exhaust temperature sensor, which is a relatively expensive component that has been used in the related art. As a result, the exhaust temperature sensor may be removed, such that a cost of the EGR system may be decreased.

Meanwhile, the normality diagnosing step may include a third measuring step of measuring the opening area of the EGR valve 24; a first calculating step of calculating a mass flow value of the EGR gas passing through the EGR valve 24 as a function of the pressure in the intake manifold 10, the temperature and the pressure between the EGR cooler 20 and the EGR valve 24, and the opening area of the EGR valve 24; a first converting step of converting the calculated mass value flow of EGR gas into a pressure value; a second calculating step of calculating a pressure value of fresh air as a function of the pressure in the intake manifold 10 and the pressure value converted in the first converting step; and a second converting step of converting the calculated pressure value of the fresh air into a mass flow value of the fresh air.

Here, the opening area of the EGR valve 24 measured in the third measuring step may be measured by a position sensor of the EGR valve 24.

In the first calculating step, the mass flow value of the EGR gas passing through the EGR valve 24 is generally represented by the following Equation 2.

$$m_2 = A_2 \cdot f(T_2) \cdot f(P_1, P_2)$$ (Equation 2)

In Equation 2, $m_2$ indicates the mass flow of EGR gas passing through the EGR valve 24, $A_2$ indicates the opening area of the EGR valve 24 measured by the position sensor of the EGR valve 24, $T_2$ indicates the temperature measured by the second integration sensor 22, and $P_1$ and $P_2$ indicate the pressures measured by the first and second integration sensors 12 and 22, respectively.

Therefore, the mass flow of EGR gas passing through the EGR valve 24 may be calculated by the above Equation 2.

In addition, in the first converting step, the mass flow value of the EGR gas may be converted into the pressure value using a function of the mass flow value of the EGR gas, a unit area of a conduit through which the EGR gas moves while passing through the EGR valve 24, and the temperature between the EGR cooler 20 and the EGR valve 24.

The pressure value of the EGR gas converted in the first converting step is represented by the following Equation 3.

$$P_3 \cdot V_2 = n_2 \cdot R \cdot T_2$$

$$P_3 = n_2 \cdot R \cdot T_2 / V_2 \quad \text{(Equation 3)}$$

where $n_2$=molecular weight of exhaust gas/mass flow ($m_2$) of EGR gas passing through EGR valve 24

In Equation 3, $P_3$ indicates the pressure value of the EGR gas passing through the EGR valve 24, R indicates a gas constant, $T_2$ indicates the temperature measured by the second integration sensor 22, and $V_2$ indicates the unit area of the conduit through which the EGR gas moves while passing through the EGR valve 24.

Here, as the molecular weight of the exhaust gas, a molecular weight of a known exhaust gas may be used.

Therefore, the mass flow value of the EGR gas passing through the EGR valve 24 may be converted into the pressure value of the EGR gas by the above Equation 3.

Meanwhile, in the second calculating step, the pressure of the fresh air passing through the throttle valve 14 is represented by the following Equation 4.

$$\text{Pressure}(P_4) \text{ of fresh air} = P_1 - P_3 \quad \text{(Equation 4)}$$

In Equation 4, $P_4$ indicates the pressure of the fresh air, $P_1$ indicates the pressure measured by the first integration sensor 12, and $P_3$ indicates the pressure of the EGR gas passing through the EGR valve 24.

Therefore, the pressure of the fresh air may be calculated by the above Equation 4.

In addition, in the second converting step, the pressure value of the fresh air may be converted into the mass flow value of the fresh air using a function of a pressure of the fresh air, a unit area of a conduit through which the fresh air is introduced into the intake manifold 10, and the temperature in the intake manifold 10.

The mass flow value of the fresh air converted in the second converting step is represented by the following Equation 5.

$$P_4 \cdot V_1 = n_1 \cdot R \cdot T_1$$

$$n_1 = R \cdot T_1 / P_4 \cdot V_1 \quad \text{(Equation 5)}$$

where $n_1$=molecular weight of fresh air/mass flow ($m_1$) of fresh air

In Equation 5, $P_4$ indicates the pressure value of the fresh air, R indicates a gas constant, $T_1$ indicates the temperature measured by the first integration sensor 12, and $V_1$ indicates the unit area of the conduit through which the fresh air passes through the throttle valve 14 and is then introduced into the intake manifold 10.

Here, as the molecular weight of the fresh air, a molecular weight of known fresh air may be used.

Therefore, the pressure value of the fresh air may be converted into the mass flow value of the fresh air by the above Equation 5.

With the above-mentioned configuration, when it is diagnosed that the efficiency of the EGR cooler 20 is normal, the EGR gas is sucked while pulse width modulation (PWM) controlling the opening area of the EGR valve 24. In this case, the mass flow and the pressure value of the EGR gas passing through the EGR valve 24 are calculated and the pressure value and the mass flow of fresh air are calculated using the mass flow and the pressure value of the EGR gas.

Meanwhile, according to various embodiments of the present invention, fuel injection is controlled using the method for diagnosing an EGR system.

More specifically, a method for controlling fuel injection may include a third measuring step of measuring the opening area of the EGR valve 24; a first calculating step of calculating a mass flow value of the EGR gas passing through the EGR valve 24 as a function of the pressure in the intake manifold 10, the temperature and the pressure between the EGR cooler 20 and the EGR valve 24, and the opening area of the EGR valve 24; a first converting step of converting the calculated mass flow value of EGR gas into a pressure value; a second calculating step of calculating a pressure value of fresh air as a function of the pressure in the intake manifold 10 and the pressure value converted in the first converting step; a second converting step of converting the calculated pressure value of the fresh air into a mass flow value of the fresh air; and a controlling step of controlling a fuel injection amount depending on the mass flow value of the fresh air.

Here, in the first converting step, the mass flow value of the EGR gas may be converted into the pressure value using a function of the mass flow value of the EGR gas, a unit area of a conduit through which the EGR gas moves while passing through the EGR valve 24, and the temperature between the EGR cooler 20 and the EGR valve 24.

Further, in the second converting step, the pressure value of the fresh air may be converted into the mass flow value of the fresh air using a function of a pressure of the fresh air, a unit area of a conduit through which the fresh air is introduced into the intake manifold 10, and the temperature in the intake manifold 10.

That is, the values calculated in the first converting step, the second converting step, the first calculating step, and the second calculating step may be represented by the above Equations 2 to 5.

Therefore, in the controlling step, the fuel injection amount may be controlled depending on the mass flow value of the fresh air converted and calculated in the second converting step.

Hereinafter, a diagnosing flow and a controlling flow of the method for diagnosing an EGR system according to various embodiments of the present invention and a method for controlling fuel injection using the same will be described.

First, after an engine starts, a vehicle speed, an engine RPM, and an intake air amount are measured, and a diagnosis of the EGR system is continuously performed in the case in which the vehicle speed, the engine RPM, and the intake air amount are equal to or larger than a reference value and is not performed in the case in which the vehicle speed, the engine RPM, and the intake air amount are less than the reference value.

Then, in the case in which the EGR system is diagnosed, the target flow of EGR is set so as to reflect the driving state of the vehicle, the pressure in the intake manifold 10 is measured by the first integration sensor 12, and the pressure and the temperature between the EGR cooler 20 and the EGR valve 24 are measured by the second integration sensor 22.

Thereafter, the pressure measured by the first integration sensor 12 and the pressure and the temperature measured by the second integration sensor 22 are substituted into the above Equation 1 to calculate and determine the opening area of the EGR valve 24 for satisfying the target flow of EGR, thereby controlling the flow of EGR gas passing through the EGR valve 24 so as to correspond to the target flow of EGR.

At this time, the temperature is measured by the second integration sensor 22. When the measured temperature exceeds a reference temperature, it is diagnosed that a fault has been generated in the EGR cooler 20, thereby controlling the EGR valve 24 to be closed or stopping an operation of the EGR system, and when the measured temperature is equal to or lower than the reference temperature, it is diagnosed that the EGR cooler 20 is normal.

Meanwhile, in the case in which it is diagnosed that the EGR cooler 20 is normal, the opening area of the EGR valve 24 is controlled to control the flow of EGR gas passing through the EGR valve 24.

In this case, the pressure measured by the first integration sensor 12, the pressure and the temperature measured by the second integration sensor 22, and the opening area measured by the position sensor of the EGR valve 24 are substituted into the above Equation 2 to calculate the mass flow value of the EGR gas passing through the EGR valve 24.

Then, the calculated mass flow value of EGR gas, the unit area of the conduit of the rear end of the EGR valve 24, and the temperature measured by the second integration sensor 22 are substituted into the above Equation 3 to convert the mass flow value of the EGR gas into the pressure value.

Next, the pressure of the fresh air is calculated by a difference between the pressure measured by the first integration sensor 12 and the pressure of the EGR gas passing through the EGR valve 24.

Thereafter, the calculated pressure of the fresh air, the unit area of the conduit of the rear end of the throttle valve 14, and the temperature measured by the first integration sensor 12 are substituted into the above Equation 5 to convert the pressure of fresh air into the mass flow value of the fresh air.

Therefore, an amount of fuel injected to the engine is controlled by a fuel injection map determined depending on the measured mass flow of fresh air.

As set forth above, according to various embodiments of the present invention, monitoring for the efficiency of the EGR cooler, which is a law item, is performed using the pressure and the temperature measured in the intake manifold and the EGR line without an exhaust temperature sensor for measuring the temperature of the EGR gas, thereby making it possible to decrease a cost through removal of the exhaust temperature sensor. In addition, a system configuration and a monitoring item are simplified to decrease an abnormal control, thereby making it possible to decrease a system error and secure quality of the EGR system.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A method for diagnosing an exhaust gas recirculation (EGR) system, comprising:
   a first measuring step of measuring a pressure in an intake manifold;
   a second measuring step of measuring a pressure and a temperature between an EGR cooler and an EGR valve;
   a determining step of calculating and determining, by a controller, an opening area of the EGR valve for satisfying a target flow of EGR using a function of the target flow of EGR, the pressure in the intake manifold, and the temperature and the pressure between the EGR cooler and the EGR valve; and
   a diagnosing step of diagnosing, by the controller, whether the EGR cooler is abnormal by comparing the temperature measured between the EGR cooler and the EGR valve and a reference temperature with each other at the time of exhausting EGR gas at the determined opening area of the EGR valve,
   wherein the diagnosing step includes:
      a fault diagnosing step of diagnosing that a fault has been generated in the EGR cooler when the temperature measured between the EGR cooler and the EGR valve exceeds the reference temperature; and
      a normality diagnosing step of diagnosing that the EGR cooler is normal when the temperature measured between the EGR cooler and the EGR valve is equal to or lower than the reference temperature,
   wherein the normality diagnosing step includes:
      a third measuring step of measuring the opening area of the EGR valve;
      a first calculating step of calculating a mass flow value of the EGR gas passing through the EGR valve as a function of the pressure in the intake manifold, the temperature and the pressure between the EGR cooler and the EGR valve, and the opening area of the EGR valve;
      a first converting step of converting the calculated mass flow value of EGR gas into a pressure value;
      a second calculating step of calculating a pressure value of fresh air as a function of the pressure in the intake manifold and the pressure value converted in the first converting step; and
      a second converting step of converting the calculated pressure value of the fresh air into a mass flow value of the fresh air, and
   wherein the controller controls a fuel injection amount of the engine depending on the mass flow value of the fresh air.

2. The method of claim 1, further comprising a judging step of judging whether an output element reflecting a driving state of a vehicle is equal to or larger than a reference value to judge whether a diagnosis is possible.

3. The method of claim 1, wherein a first integration sensor is installed in the intake manifold to measure both of a pressure and a temperature of an intake air, and
   a second integration sensor is installed between the EGR cooler and the EGR valve to measure both of a pressure and a temperature of the EGR gas.

4. The method of claim 1, wherein in the determining step, the target flow of EGR is determined depending on a target opening area of the EGR valve to calculate and determine the opening area of the EGR valve so as to satisfy the target opening area, thereby satisfying the target flow of EGR.

5. The method of claim 1, wherein the opening area of the EGR valve is measured by a position sensor of the EGR valve.

6. The method of claim 1, wherein in the first converting step, the mass flow value of the EGR gas is converted into the pressure value using a function of the mass flow value of the EGR gas, a unit area of a conduit through which the EGR gas moves while passing through the EGR valve, and the temperature between the EGR cooler and the EGR valve.

7. The method of claim 1, wherein in the second converting step, the pressure value of the fresh air is converted into the mass flow value of the fresh air using a function of a pressure of the fresh air, a unit area of a conduit through which the fresh air is introduced into the intake manifold, and the temperature in the intake manifold.

8. A method for controlling the fuel injection amount using the method of claim 1, comprising:
- a third measuring step of measuring the opening area of the EGR valve;
- a first calculating step of calculating a mass flow value of the EGR gas passing through the EGR valve as a function of the pressure in the intake manifold, the temperature and the pressure between the EGR cooler and the EGR valve, and the opening area of the EGR valve;
- a first converting step of converting the calculated mass flow value of EGR gas into a pressure value;
- a second calculating step of calculating a pressure value of fresh air as a function of the pressure in the intake manifold and the pressure value converted in the first converting step;
- a second converting step of converting the calculated pressure value of the fresh air into a mass flow value of the fresh air; and
- a controlling step of controlling the fuel injection amount depending on the mass flow value of the fresh air.

9. The method of claim 8, wherein in the first converting step, the mass flow value of the EGR gas is converted into the pressure value using a function of the mass flow value of the EGR gas, a unit area of a conduit through which the EGR gas moves while passing through the EGR valve, and the temperature between the EGR cooler and the EGR valve.

10. The method of claim 8, wherein in the second converting step, the pressure value of the fresh air is converted into the mass flow value of the fresh air using a function of a pressure of the fresh air, a unit area of a conduit through which the fresh air is introduced into the intake manifold, and the temperature in the intake manifold.

* * * * *